(12) United States Patent
Spreitzenbarth et al.

(10) Patent No.: US 11,225,982 B2
(45) Date of Patent: Jan. 18, 2022

(54) PROCESS CONTROL DEVICE

(71) Applicant: Festo SE & Co. KG, Esslingen (DE)

(72) Inventors: Rainer Spreitzenbarth, Esslingen (DE); Axel Müller, Böblingen (DE); Simon Lechler, Stuttgart (DE)

(73) Assignee: FESTO SE & CO. KG, Esslingen (DE)

( * ) Notice: Subject to any disclaimer, the term of this patent is extended or adjusted under 35 U.S.C. 154(b) by 46 days.

(21) Appl. No.: 16/622,680

(22) PCT Filed: Jun. 16, 2017

(86) PCT No.: PCT/EP2017/064817
§ 371 (c)(1),
(2) Date: Dec. 13, 2019

(87) PCT Pub. No.: WO2018/228705
PCT Pub. Date: Dec. 20, 2018

(65) Prior Publication Data
US 2021/0140450 A1    May 13, 2021

(51) Int. Cl.
*F16K 31/02*    (2006.01)
*F15B 5/00*    (2006.01)
(Continued)

(52) U.S. Cl.
CPC ............ *F15B 5/006* (2013.01); *F15B 15/202* (2013.01); *F15B 21/003* (2013.01);
(Continued)

(58) Field of Classification Search
CPC ...... F15B 5/006; F15B 15/202; F15B 21/003; F15B 2013/006; F16K 31/004; F16K 31/06; F16K 31/1223; F16K 37/0041
(Continued)

(56) References Cited

U.S. PATENT DOCUMENTS 3,513,876 A * 5/1970 Tarbox ................ F15B 13/0864
137/596
3,677,577 A * 7/1972 Krauer .................. G01N 35/08
285/124.4
(Continued)

FOREIGN PATENT DOCUMENTS

| CN | 101275594 A | 10/2008 |
|---|---|---|
| CN | 102588652 A | 7/2012 |

(Continued)

*Primary Examiner* — Minh Q Le
(74) *Attorney, Agent, or Firm* — Hoffmann & Baron, LLP

(57) ABSTRACT

A process control device has an electropneumatic control unit which is used for activating a pneumatic actuating drive. The control unit has a fastening module by means of which it is fastened to a drive housing of the actuating drive. The control unit includes an interface plate which is separate from the fastening module, is mounted on a top side of the fastening module and is fluidically connected, through the fastening module, to the actuating drive. The control unit includes an electrically actuatable control valve device which is fixed to the fastening module by being mounted on the interface plate fixed to the fastening module. In this way, a process control device can be produced in an easily and variably configurable manner.

19 Claims, 5 Drawing Sheets

(51) Int. Cl.
*F15B 15/20* (2006.01)
*F15B 21/00* (2006.01)
*F16K 31/00* (2006.01)
*F16K 31/06* (2006.01)
*F16K 31/122* (2006.01)
*F16K 37/00* (2006.01)
*F15B 13/00* (2006.01)

(52) U.S. Cl.
CPC ............ *F16K 31/004* (2013.01); *F16K 31/06* (2013.01); *F16K 31/1223* (2013.01); *F16K 37/0041* (2013.01); *F15B 2013/006* (2013.01)

(58) Field of Classification Search
USPC .................. 137/487.5, 269, 315.11, 485
See application file for complete search history.

(56) References Cited

U.S. PATENT DOCUMENTS

| | | | | |
|---|---|---|---|---|
| 5,458,048 | A * | 10/1995 | Hohner | F15B 13/0814 |
| | | | | 91/459 |
| 5,904,172 | A * | 5/1999 | Gifft | A47C 27/082 |
| | | | | 137/224 |
| 6,179,006 | B1 * | 1/2001 | Stoll | F15B 13/0817 |
| | | | | 137/269 |
| 6,234,191 | B1 * | 5/2001 | Clarke | B60T 17/04 |
| | | | | 137/269 |
| 6,763,848 | B2 * | 7/2004 | Rondreux | F15B 13/0817 |
| | | | | 137/269 |
| 6,766,649 | B2 * | 7/2004 | Burlingame | B66D 1/08 |
| | | | | 137/884 |
| 6,834,669 | B2 * | 12/2004 | Seyfarth | F15B 13/0814 |
| | | | | 137/354 |
| 6,892,749 | B2 * | 5/2005 | Fukano | F15B 13/0817 |
| | | | | 137/269 |
| 6,938,644 | B2 * | 9/2005 | Eidsmore | F15B 13/086 |
| | | | | 137/884 |
| 7,048,007 | B2 * | 5/2006 | Nordstrom | F15B 13/0814 |
| | | | | 137/884 |
| 7,784,497 | B2 * | 8/2010 | Eriksson | F16K 27/003 |
| | | | | 137/884 |
| 7,841,363 | B1 * | 11/2010 | Suharno | F15B 13/0817 |
| | | | | 137/884 |
| 7,971,520 | B2 | 7/2011 | Nölle | |
| 9,803,765 | B2 * | 10/2017 | Inaba | F15B 13/0821 |
| 10,575,654 | B2 * | 3/2020 | Shakal | A47C 27/082 |
| 10,753,375 | B2 * | 8/2020 | Westermann | F15B 13/0401 |
| 10,830,368 | B2 * | 11/2020 | Bruczuk | F16K 27/003 |
| 2006/0272710 | A1 * | 12/2006 | Minervini | F16K 37/0033 |
| | | | | 137/487.5 |
| 2013/0233416 | A1 * | 9/2013 | Uwe | F16K 27/04 |
| | | | | 137/554 |
| 2015/0276079 | A1 * | 10/2015 | Inaba | F16K 27/003 |
| | | | | 137/884 |
| 2019/0195246 | A1 * | 6/2019 | Jamison | F15B 13/0821 |
| 2019/0316604 | A1 * | 10/2019 | Markowski | F15B 15/2815 |
| 2020/0191173 | A1 * | 6/2020 | Neef | F15B 15/20 |
| 2020/0221626 | A1 * | 7/2020 | Gomes | F15B 15/1428 |
| 2020/0248831 | A1 * | 8/2020 | Keeper | F16K 7/17 |

FOREIGN PATENT DOCUMENTS

| | | |
|---|---|---|
| DE | 2303324 | 8/1973 |
| DE | 102007058253 A1 | 6/2009 |
| DE | 102010050662 A1 | 5/2012 |
| DE | 102013208153 A1 | 11/2014 |
| EP | 2479465 A1 | 7/2012 |
| EP | 2627935 A1 | 8/2013 |
| GB | 2138108 A | 10/1984 |
| GB | 2245313 A | 1/1992 |
| WO | 02/093058 A1 | 11/2002 |
| WO | 20162023456 A1 | 12/2016 |

* cited by examiner

PROCESS CONTROL DEVICE

This application claims priority based on an International Application filed under the Patent Cooperation Treaty, PCT/EP2017/064817, filed Jun. 16, 2017.

BACKGROUND OF THE INVENTION

The invention relates to a process control device comprising an electropneumatic control unit, which is constructed to control a pneumatic actuating drive and which has a fastening module which has at a lower side a fastening interface which is constructed for fastening to a drive housing of the actuating drive and which has an electrically actuatable control valve device which is fixed to the fastening module and which contains at least one control valve and which communicates with at least one drive channel which extends through the fastening module for fluid connection to the actuating drive.

A process control device known from WO 02/093058 A1 of this type contains a process valve having an actuating drive and an electropneumatic control unit which is fitted to the actuating drive. The control unit has a housing having a lower portion which is used as a fastening module for fixing to the drive housing of the actuating drive. The fastening module acts at the same time as a direct carrier for a control valve device which is fitted to the upper side thereof and which is accommodated in the housing of the control unit. The control unit also contains means for generating feedback signals of the actuating drive in order to be able to control the position of a movable drive unit of the actuating drive and consequently the operating state of the process valve.

GB 2 138 108 A discloses a valve unit having an actuating drive and a control unit which is mounted at the rear side on the actuating drive. The control unit is provided with an electrically actuatable control valve device and contains means for generating feedback signals of the actuating drive.

There is known from DE 10 2007 058 253 A1 a device for controlling a process valve which has an electronic module and at least one solenoid valve. The solenoid valve is mounted on the upper side of a base portion which is secured to an end side of the process valve which is intended to be controlled.

There is known from DE 23 03 324 A a flow control device which has a piston/cylinder unit on which there is mounted at the end side via a base a control arrangement which has an air valve which is fitted to the base.

SUMMARY OF THE INVENTION

An object of the invention is to provide a process control device which with simple production can be configured in a cost-effective manner for different applications.

In order to achieve this object, together with the features mentioned in the introduction, there is provision for the control unit to have an interface plate which is separate from the fastening module and which is mounted on the fastening module at the upper side thereof facing away from the fastening interface and through which an interface plate fluid channel system extends which communicates with the at least one drive channel of the fastening module, wherein the interface plate at the upper side thereof facing away from the fastening module has a mechanical-pneumatic assembly interface on which the control valve device is mounted with simultaneous communication with the interface plate fluid channel system.

The process control device according to the invention contains an electropneumatic control unit which can be fixed by means of a fastening module, which belongs to the control unit, to the drive housing of an actuating drive which is intended to be operationally controlled by the electropneumatic control unit. In order to be fixed to the drive housing of the actuating drive, the fastening module has at a lower side a correspondingly designed fastening interface. An electrically actuatable control valve device which belongs to the control unit is fixed to the fastening module, but not directly and instead indirectly with the interposition of a separate, preferably rigid interface plate which is mounted on the fastening module at the upper side thereof opposite the lower side. The interface plate has at the upper side thereof facing away from the fastening module a mechanical-pneumatic assembly interface to which the control valve device is mechanically fixed and which communicates at the same time with a fluid channel system which is formed in the interface plate and which is referred to as an interface plate fluid channel system. Since the interface plate fluid channel system communicates with at least one drive channel which extends through the fastening module and which, when the control unit is in a state fastened to an actuating drive, can be used to actuate the actuating drive, the interface plate acts not only as a fastening base for the control valve device, but also as a pneumatic interface element for the pneumatic connections required to control the actuating drive. The interface plate affords the possibility of carrying out a fluidic and mechanical adaptation of the respectively used control valve device to a fastening module which is uniform for all applications and which generally, in addition to a fastening module fluid channel system which has at least one drive channel, also has to have other functionally relevant components, for example, fastening means for a housing and/or for an control electronics and/or a feedback device for feedback signals of the actuating drive.

Advantageous developments of the invention will be appreciated from the dependent claims.

The control valve device is preferably constructed as a structural unit which in the state not mounted on the interface module can be handled in a uniform manner and can also be referred to as a control valve unit. This structural unit advantageously also comprises a support plate which carries each control valve of the control valve device and through which there extends a fluid channel system which is referred to as the support plate fluid channel system and which communicates with the at least one control valve of the control valve device. The control valve device is mounted as a structural unit with the support plate being arranged on the assembly interface of the interface plate in such a manner that the support plate fluid channel system thereof is in fluid connection with the interface plate fluid channel system of the interface plate. In particular when the control valve device has a plurality of control valves, consequently, a complex individual assembly of several control valves on the interface plate becomes superfluous.

At the lower side thereof facing the interface plate, the support plate advantageously has a mechanical-pneumatic attachment interface which is adapted to the assembly interface of the interface plate. The interface plate is thereby fixed to the interface plate by means of cooperation with the assembly interface. At the opposite upper side of the interface plate there is an equipment face which, depending on the embodiment of the control valve device, is equipped with one or more control valves. Each of these control valves is in fluid connection with the support plate fluid channel system which is formed in the support plate.

In a preferred embodiment, the support plate is constructed in one piece. However, it may also alternatively have a modular structure and be composed of a plurality of plate-like support plate modules which are stacked one on the other in the vertical direction thereof.

The modular structure enables, for example, as a result of grooves formed in the mutually facing joint faces of the support plate modules, complex channel guides to also be produced within the support plate without having to use transverse holes and consequently coherent ball formations.

The number of control valves of the control valve device varies in particular depending on the desired control functionality and/or type of the actuating drive which is intended to be controlled. The actuating drive may, for example, be a single-action actuating drive or a dual-action actuating drive, wherein in order to control a dual-action actuating drive a different number of control valves is used from that for controlling a single-action actuating drive. However, the control valve device may also in the case of a dual-action actuating drive have only a single control valve which has a corresponding valve functionality.

If the control valve device is provided with a plurality of control valves, this plurality of control valves—in particular depending on the type of control valves—may either be secured individually to the support plate or in a unified manner via a common base member.

The process control device can be produced in a particularly cost-effective manner when all the fluid channels of the interface fluid channel system are constructed in such a manner that they extend through the interface plate in a linear manner in the vertical direction thereof. There are thereby preferably produced identical opening patterns of the fluid channels on the one hand at the lower side and on the other hand at the upper side of the interface plate.

The interface plate may be fixed, for example, by means of engagement or pressing on the fastening module. A particularly simple and nonetheless stable fixing is, however, achieved by the interface plate being fixed to the fastening module by means of fastening screws which extend through the fastening module from below. Each fastening screw advantageously engages from below in a fastening hole of the interface plate which is designed like a blind-hole and is provided with an inner thread.

It is in principle possible to place the interface plate as a raised component on the fastening module. However, particularly compact height dimensions of the control unit can be achieved if the interface plate is inserted in a receiving recess constructed in the upper side in the fastening module. The peripheral contour of the receiving recess advantageously corresponds in this instance at least substantially to that of the interface plate. It is advantageous for the interface plate to be completely received in the receiving recess in such a manner that it extends at the upper side in a flush manner with the portions of the upper side of the fastening module which comprises the receiving recess.

The process control device advantageously comprises a plurality of different control valve devices of different types. These typically different control valve devices differ from each other in particular at least in terms of their functionality and/or structure. For example, a first control valve device type may contain at least one piezo valve as a control valve, whilst at least a second control valve device type contains at least one solenoid valve as a control valve. Different control valve device types may also result from the fact that the number of integrated control valves is different. Different functionalities may, for example, be configured in that a control valve device of a first type has a 3/3 valve functionality, whilst a second type of control valve devices has a 5/3 valve functionality.

In any case, the assembly interface of the interface plate is preferably constructed in such a manner that it enables an alternative assembly of a control valve device of any control valve device type which is provided. Consequently, in the production of the process control device, it is possible, depending on the intended application of the process control device, to provide the interface plate with a control valve device which is selected from the ready plurality of control valve device types. Consequently, the control device can be assembled in a cost-effective manner on the basis of a kit system.

The mechanical-pneumatic assembly interface which is formed at the upper side of the fastening module advantageously has a plurality of fastening holes which are provided with an inner thread and into which in order to fix the control valve device it is possible to screw accordingly adapted fastening screws which are supported on the control valve device. In this instance, the assembly interface for the alternative assembly of different types of control valve devices may have individual fastening holes. Alternatively, however, the assembly interface may also be constructed in such a manner that for the different control valve devices in some cases the same and in some cases different fastening holes are provided. Of course, in principle, it is also possible to construct the assembly interface in such a manner that the fastening holes which are provided can be used in each case for all types of control valve devices.

For fluid-tight sealing of the fluid connections between the fastening module and the interface plate, a mask-like, in particular resilient sealing element is advantageously inserted between these two components. This sealing element has a plurality of apertures, which are surrounded by a sealing structure. Such a mask-like sealing element can be handled during assembly in a significantly simpler manner than a plurality of individual sealing rings.

The fastening module is preferably constructed in a plate-like manner. It may, for example, act as a lower terminal wall of a housing of the control unit, in which the control valve device is accommodated.

The process control device advantageously comprises a pneumatically actuatable actuating drive, which has a drive housing, in which there extends a drive unit which can be moved by means of controlled application of compressed air and which protrudes at a front side of the drive housing in order to be connected or be able to be connected to a component which is intended to be driven. The component to be driven is in particular a valve member of a valve fitting of a process valve to which the actuating drive advantageously belongs.

The control unit is fitted by means of the fastening interface of the fastening module thereof at the rear side to the drive housing.

The electropneumatic control unit advantageously has a control electronics which is connected for electrical control to the control valve device. The control electronics is in particular constructed for processing feedback signals of the actuating drive in order to be able to operate the actuating drive independently of these feedback signals and in particular to be able to move and position a movable drive unit of the actuating drive in a manner dependent on the feedback signals.

For the control unit, different functional forms may be considered. For example, the control unit may be constructed for an unregulated control of the control valve device, wherein there are supplied thereto as feedback signals, for example, simple sensor signals which are generated in a manner dependent on specific positions of the drive unit of the actuating drive. However, an embodiment of the control unit as a position control unit is particularly advantageous which could also be referred to as a positioner and whose control electronics has a regulation functionality in order to be able to operate the actuating drive with a controlled operating mode, in particular with a position regulated control of the movable drive unit. In this instance, the control electronics advantageously has a desired value input, via which it can be or is connected to an external electronic control device and which can predetermine desired values with regard to which the position control unit controls the connected actuating drive in terms of position.

The electrically actuatable control valve device may be composed of only a single control valve or a group of control valves. The control valve device preferably has a continuous functional characteristic or is configured for pulse-width-modulated operation. It may be constructed for direct actuation by means of control signals which are provided by the control electronics or may be of an electromagnetically precontrolled construction type. It is advantageous for the control unit to contain as a precontrol stage an e-p converter, which in particular operates in accordance with the nozzle/flapper principle.

BRIEF DESCRIPTION OF THE DRAWINGS

The invention is explained in greater detail below with reference to the appended drawings, in which:

FIG. 4(b) shows a structural unit which is composed of a fastening module and an interface plate according to FIG. 4(g), and FIGS. 4(c), 4(d), 4(e) and 4(f) show various different types of control valve devices which can be combined with the structural unit according to FIG. 4(b), wherein the control unit according to FIG. 4(a) illustrates a combination of the components according to FIGS. 4(b) and 4(c)

DETAILED DESCRIPTION OF THE PREFERRED EMBODIMENTS

Figure 1:
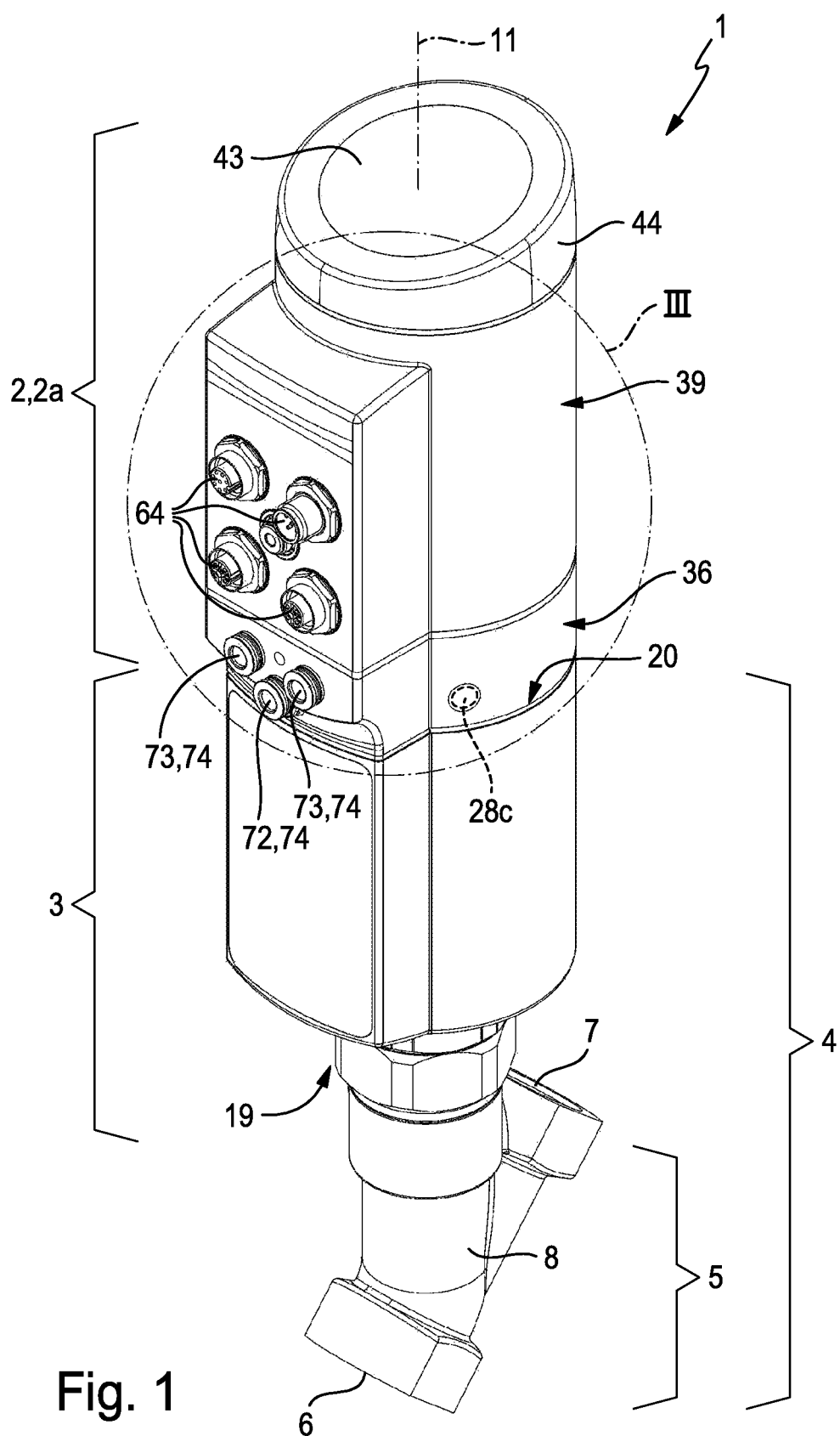
FIG. 1 is an isometric illustration of a preferred embodiment of the process control device according to the invention which has a process valve which has an actuating drive to which an electropneumatic control unit is fitted.

The process control device which is generally designated 1 contains an electropneumatic control unit 2. This control unit 2 is constructed to be able to control a pneumatic actuating drive 3 for the purposes of the actuation thereof. The actuating drive 3 is preferably also a component of the process control device 1.

The actuating drive 3 is advantageously a component of a process valve 4. A valve fitting 5 also belongs to the process valve 4. The process valve 4 is advantageously in its entirety also a component of the process control device 1.

The valve fitting 5 has at least two fitting connections 6, 7 for introducing into the path of a pipeline and has a valve member 12 which is movably arranged in a fitting housing 8 and which can be positioned in different positions in order to block a fluid connection between the two fitting connections 6, 7 or to release them with variable cross-section.

The pneumatic actuating drive 3 has a drive housing 13 which is fitted with a front side 19 at the front to the fitting housing 8. In the drive housing 13, there extends a drive unit 14 which can be moved relative to the drive housing 13 and which is coupled in terms of movement to the valve member 12 and which by means of pneumatic control of the actuating drive 3 can be caused to carry out a linear drive movement 15 which is indicated by a double-headed arrow and by which the position of the valve member 12 can be changed.

The actuating drive 3 is preferably a linear drive. The drive movement 15 is in this instance a linear movement which follows the axial direction of a main axis 11. The drive housing 13 has a longitudinal structure which extends in the axial direction of the main axis 11, wherein the longitudinal axis thereof is preferably identical to the main axis 11.

In an embodiment which is also not illustrated, the actuating drive 3 is constructed as a rotary drive. This is particularly the case when the valve member 12 which is intended to be actuated is a rotary valve.

The drive housing 13 surrounds a housing inner space 16 which is subdivided into two operating chambers by means of a drive member 17 which can be moved at least partially in the axial direction of the main axis 11, into a second operating chamber 16b which is associated with the front side 19 and a first operating chamber 16a which is associated with the rear side 20 of the drive housing 13 opposite the front side 19.

Via a spindle 18 which extends in the axial direction of the main axis 11 or another coupling member, the drive member 17 is connected in terms of driving and in particular in a secure manner to the valve member 12. The spindle 18 protrudes at the front side 19 from the drive housing 13 and is introduced in the fitting housing 8, where it cooperates with the valve member 12.

In the embodiment, the drive member 17 is a piston which is arranged in the housing inner space 16 so as to be able to be slidingly displaced. It is provided with sealing means, which are in sealing abutment so as to be able to be slidingly displaced with the inner peripheral face of a tubular housing portion 22 of the drive housing 13 which extends in the axial direction of the longitudinal axis 11. In an embodiment which is not illustrated, in place of an on the whole movable drive piston a drive membrane which is formed by an at least partially resiliently deformable membrane is provided as a drive member 17.

The drive housing 13 has at the front side 19 thereof a front housing wall 23 through which the drive unit 14 extends in a linearly movable manner. This front housing wall 23 is in particular constructed integrally with the tubular housing portion 22. In the region of the rear side 20, the drive housing 13 has a rear housing wall 24 which is secured with sealing to the tubular housing portion 22 and which together with this tubular housing portion 22 and the front housing wall 23 delimits the housing inner space 16. Preferably, the rear housing wall 24 is inserted from the rear side 20 to some degree axially into the tubular housing portion 22. A fluid channel, which is indicated only schematically and which is referred to for better differentiation as the first drive housing channel 25, extends through the rear housing wall 24 or another housing component and opens in the first operating chamber 16a.

Another fluid channel, which is also indicated only schematically with dot-dash lines and which is referred to as the second drive housing channel 26, extends in the wall of the drive housing 13 and opens in particular in the region of the front housing wall 23 in the second operating chamber 16b.

Both drive housing channels 25, 26 further open in the region of the rear side 20 at the drive housing 13 so that from this rear side 20 a drive fluid which is formed by compressed air can be guided through the drive housing channels 25, 26 in a controlled manner in order to act on the drive member 17 and, for the purposes of positioning of the drive unit 14, to drive it to carry out the drive movement 15.

There is formed on the drive housing 13 a coupling interface 27 on which the control unit 2 is secured in a preferably releasable manner by means of a fastening interface 28 which is formed thereon and which is adapted to the coupling interface 27. The coupling interface 27 is advantageously located according to the embodiment on the rear side 20 of the drive housing 13. By way of example, it is formed together with the rear end region of the tubular housing portion 22 and the rear housing portion 24, wherein the portion 24 may have an axial coupling continuation 32 which protrudes at the rear side axially over the tubular housing portion 22. This axial coupling continuation 32 has in the embodiment a radially protruding coupling collar 33.

The control unit 2 extends in an axial direction of the main axis 11 and has two front sides which are orientated opposite each other in the main axial direction and which for better differentiation are referred to as the lower side 34 and upper side 35. The lower side 34 faces the actuating drive 3. The lower termination of the control unit 2 is formed by a fastening module 36 which is preferably constructed in a plate-like manner and on whose lower side 41 facing the actuating drive 3 the fastening interface 28 of the control unit 2 is formed.

Preferably, the fastening module 36 forms a housing lower portion, which is constructed in particular as a terminal wall, of a control unit housing 37 which surrounds a housing inner space 38 and which shields it with respect to the environment. A housing upper portion 39 of the control unit housing 37 is advantageously placed on an upper side 42 of the fastening module 36 facing away from the actuating drive 3 in the axial direction of the main axis 11 and fixed thereto with sealing.

Figure 4:
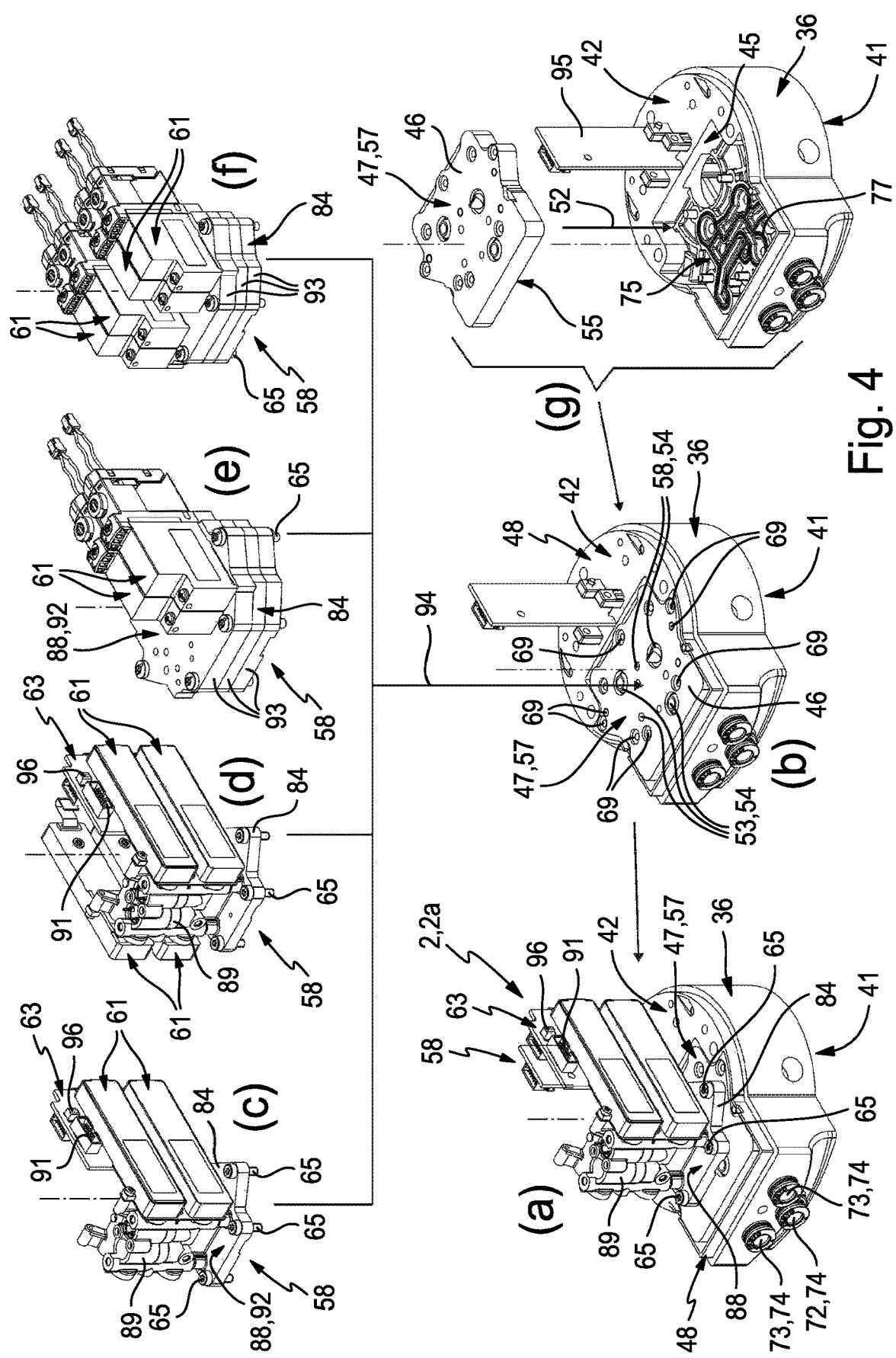
FIG. 4 is an isometric illustration of a preferred embodiment of the electropneumatic control unit which is integrated in the process control device according to the cut-out III bordered with dot-dash lines in FIGS. 1 and 2, wherein, however, components of a housing of the control unit are not shown in order to make details of the control unit visible, wherein in FIG. 4(a) the assembled control unit can be seen.
Figure 5:
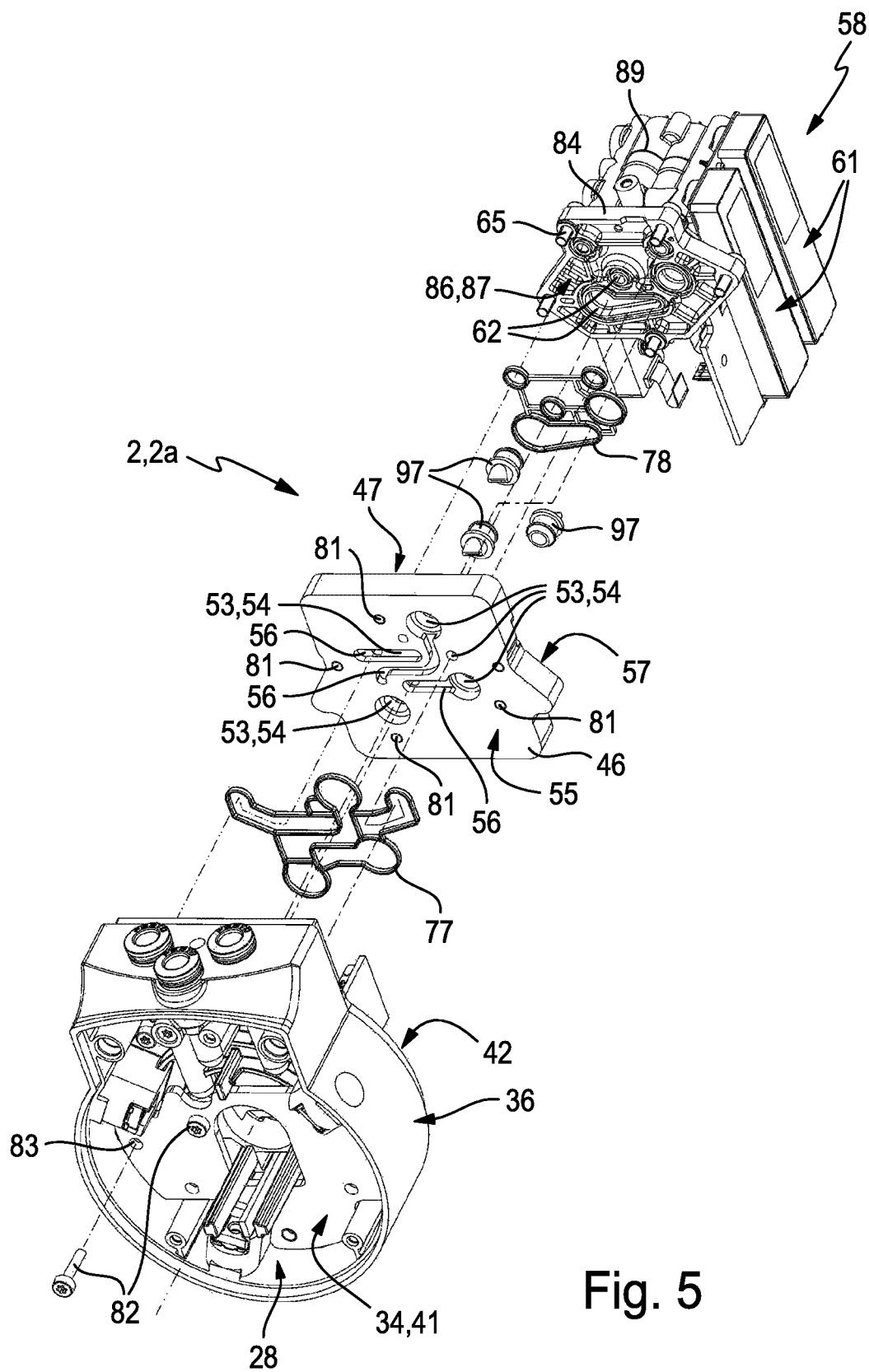
FIG. 5 is a perspective, exploded view of the control unit according to FIG. 4(a).

In FIG. 4(a) and in FIG. 5, the control unit 2 is depicted without the housing upper portion 39.

The housing upper portion 39 advantageously has in the region of the upper side 35 a display region 43 which is constructed to display operating information of the process control device 1 and which is advantageously combined with an upper housing cover 44 of the housing upper portion 39 which may be constructed to be removable or also non-removable.

The fastening interface 28 of the fastening module 36 contains in the embodiment an annular projection 28a which is concentric with respect to the main axis 11 and which abuts the rear end region of the tubular housing portion 22 and furthermore a recess 28b in which the axial coupling continuation 32 of the rear housing wall 24 is introduced.

Furthermore, the fastening interface 28 includes a plurality of and preferably three fastening screws 28c which are distributed over the periphery and which are indicated only partially and which extend radially through an annular portion of the fastening module 36 which surrounds the recess 28b and engage below the coupling collar 33 of the coupling continuation 32 at the axial side facing away from the actuating drive 3. Accordingly, in the embodiment the rear end region of the tubular housing portion 22 and the axial coupling continuation 32 belong to the coupling interface 27.

Although the embodiment of a coupling interface 27 shown and a fastening interface 28 which is adapted thereto is particularly advantageous, it can be replaced by another embodiment, for example, by means of a bayonet connection.

The fastening module 36 is provided at the upper side 42 thereof with a receiving recess 45. The base face of this receiving recess 45 is, as can be seen in particular in FIG. 4(b), smaller than the overall surface of the fastening module 36 at the upper side 42 thereof.

An interface plate 46 which is constructed separately with respect to the fastening module 36 is inserted in the receiving recess 45. The interface plate 46 is preferably constructed in a rigid manner. It comprises in particular metal, whilst the fastening module 36 preferably comprises a plastics material.

Preferably, the height of the interface plate 46 measured in the axial direction of the main axis 11 corresponds to the accordingly measured depth of the receiving recess 45 so that the interface plate 46 is received in particular completely in the receiving recess 45 and extends with the upper side 47 thereof flush with the surface portions of the upper side 42 of the fastening module 36 which surround the receiving recess 45.

In an embodiment which is not illustrated, the interface plate 46 rests on a non-recessed upper side 42 of the fastening module 36. In contrast, the illustrated embodiment has the advantage that the structural unit composed of the fastening module 36 and the interface plate 46 does not have a greater height than the fastening module 36 itself.

For reasons of simplification, the structural unit composed of the fastening module 36 and the interface plate 46 which is fixed thereto is referred to as a base unit 48 of the control unit 2. In FIG. 4(g), the fastening module 36 and the interface plate 46 are shown prior to assembly. The assembly is carried out by inserting the interface plate 46 into the receiving recess 45 in the main axial direction in accordance with the arrow 52. The assembled base unit 48 can be seen in FIG. 4(b).

A plurality of fluid channels 53 through which compressed air can flow extend through the interface plate 46 and together form a fluid channel system which for better differentiation is referred to as the interface plate fluid channel system 54. This interface plate fluid channel system 54 opens both at the upper side 47 which faces away from the fastening module 36 and at the lower side 55 of the interface plate 46 facing the fastening module 36. Preferably, all the fluid channels 53 of the interface fluid channel system 54 extend through the interface plate 46 in the vertical direction thereof from the upper side 47 to the lower side 55. The resulting opening patterns at the upper side 47 and at the lower side 55 may differ from each other, but are preferably identical to each other. As can be seen in FIG. 5, groove-like recesses 56 may be formed in the lower side of the interface plate 46 in order to achieve a particular fluid guiding in the transition region between the interface plate 46 and the fastening module 36.

The interface fluid channel system 54 does not open at the side face of the interface plate 46 orientated at right-angles with respect to the vertical direction of the interface plate 46.

The upper side 47 of the interface plate 46 defines a mechanical-pneumatic assembly interface 57 on which an electrically actuatable control valve device 58 of the control unit 2 is mounted in a preferably releasable manner FIG. 4 shows in the illustrations (c), (d), (e) and (f), by way of example, four possible embodiments of control valve devices 58 which can be mounted as alternatives with respect to each other on the assembly interface 57. The control valve devices 58 illustrated in FIG. 4 differ from each other in terms of their functionality and/or structure so that it can be said that there are a plurality of control valve devices 58 of different types, that is to say, different control valve device types. In the embodiment illustrated in FIGS. 1 to 3 and 5, the interface plate 46 is provided with a control valve device 58 of the control valve device type depicted in FIG. 4(c).

The control valve device 58 contains at least one electrically actuatable control valve 61. The illustrated embodiments have in common that each control valve device 58 has a plurality of control valves 61. In the control valve device type according to FIGS. 4(c) and 4(e), two control valves 61 are present, whilst the control valve device types 58 according to the illustrations 4(d) and 4(f) are provided with four control valves 61.

The control valves 61 of the control valve device types according to FIGS. 4(c) and 4(d) are constructed as piezo valves, in particular based on piezo bending transducers. In contrast, the control valves 61 of the control valve device types according to FIGS. 4(e) and 4(f) are constructed as solenoid valves. Each control valve device 58 may also contain a combination of different control valve types. The control valves 61 may be so-called directly actuated control valves 61 or also electropneumatically precontrolled control valves 61. The latter valve has the advantage that with a small drive power high throughflow rates of compressed air can be controlled.

The control valve device 58 is provided with an internal control valve fluid channel system 62 which is composed of a plurality of valve channels and which is only partially indicated in the drawing. The control valves 61 are depending on their switching position capable of controlling the passage of fluid through the control valve fluid channel system 62 and in particular of preventing or permitting a passage of fluid depending on the switching position. The control valves 61 may be constructed as switching valves or as constant valves or proportional valves.

The electrical control signals required to predetermine the operating state thereof are received by the control valve device 58 from a control electronics 63 which is preferably constructed on one or more plates and which is advantageously accommodated in the housing inner space 38 and fixed to the fastening module 36. The electrical connection lines between the control electronics 63 and the control valve device 58 are not illustrated. Also not illustrated are electrical connection lines between the control electronics 63 and electromechanical interface means 64 which are arranged on the control unit housing 37 so as to be accessible from the outer side and via which an electrical connection to an external electronic control device which is not illustrated in greater detail is possible.

The control valve device 58 is secured by means of fastening screws 65 to the interface plate 46, in particular in a releasable manner. In this instance, the control valve fluid channel system 62 communicates in accordance with assignment with the interface plate fluid channel system 54 so that a fluid transfer between these two components is possible.

There is further a fluid connection between the interface plate fluid channel system 54 and a fastening module fluid channel system 66 which is composed of a plurality of fluid channels and which extends through the fastening module 36. The latter system comprises in the embodiment illustrated two drive channels 67, 68 which open in such a manner at the lower side 41 of the fastening module 36 that they are each connected in fluid terms to one of the two drive housing channels 25, 26 of the actuating drive 3.

The fluid channels of the fastening module fluid channel system 66 also contain a supply channel 72 and at least one ventilation channel 73, wherein preferably two such ventilation channels 73 are provided. Both the supply channel 72 and each ventilation channel 73 opens via an individual connection opening 74 with which a line connection device is advantageously associated, at an outer face of the fastening module 36.

The above-mentioned fluid channels 67, 68, 72, 73, 74 of the fastening module fluid channel system 66 also open at an assembly face 75 which is formed on the upper side 42 of the fastening module 36 and against which the interface plate 46 abuts with the lower side 55 thereof. The assembly face 75 is in the embodiment formed by the base face of the receiving recess 45. The opening pattern of the fastening module fluid channel system 66 on the assembly face 75 and the opening pattern of the openings of the interface plate fluid channel system 54 present at the lower side 55 of the interface plate 46 are adapted to each other in such a manner that the fluid channels at both sides communicate with each other in accordance with assignment. It is consequently ensured that both the two drive channels 67, 68 and the supply channel 72 and each ventilation channel 73 communicate with the control valve device 58 mounted on the interface plate 46.

During operation of the process control device 1, the supply channel 72 is connected via a fluid line which is not illustrated in greater detail to an external compressed air source. Each ventilation channel 73 communicates via the associated connection opening 74 with the atmosphere. Using the control electronics 63, the control valve device 58 can be controlled in such a manner that each of the two drive channels 67, 68, being separated at the same time from the other channel in each case, is connected to either the supply channel 72 or the ventilation channel 73. Furthermore, each drive channel 67, 68 may at the same time be blocked from both the supply channel 72 and also the ventilation channel 73. In this manner, a controlled fluid application to the two operating chambers 16a, 16b of the actuating drive 3 is possible, resulting in a movement and/or positioning of the drive unit 14.

Figure 2:
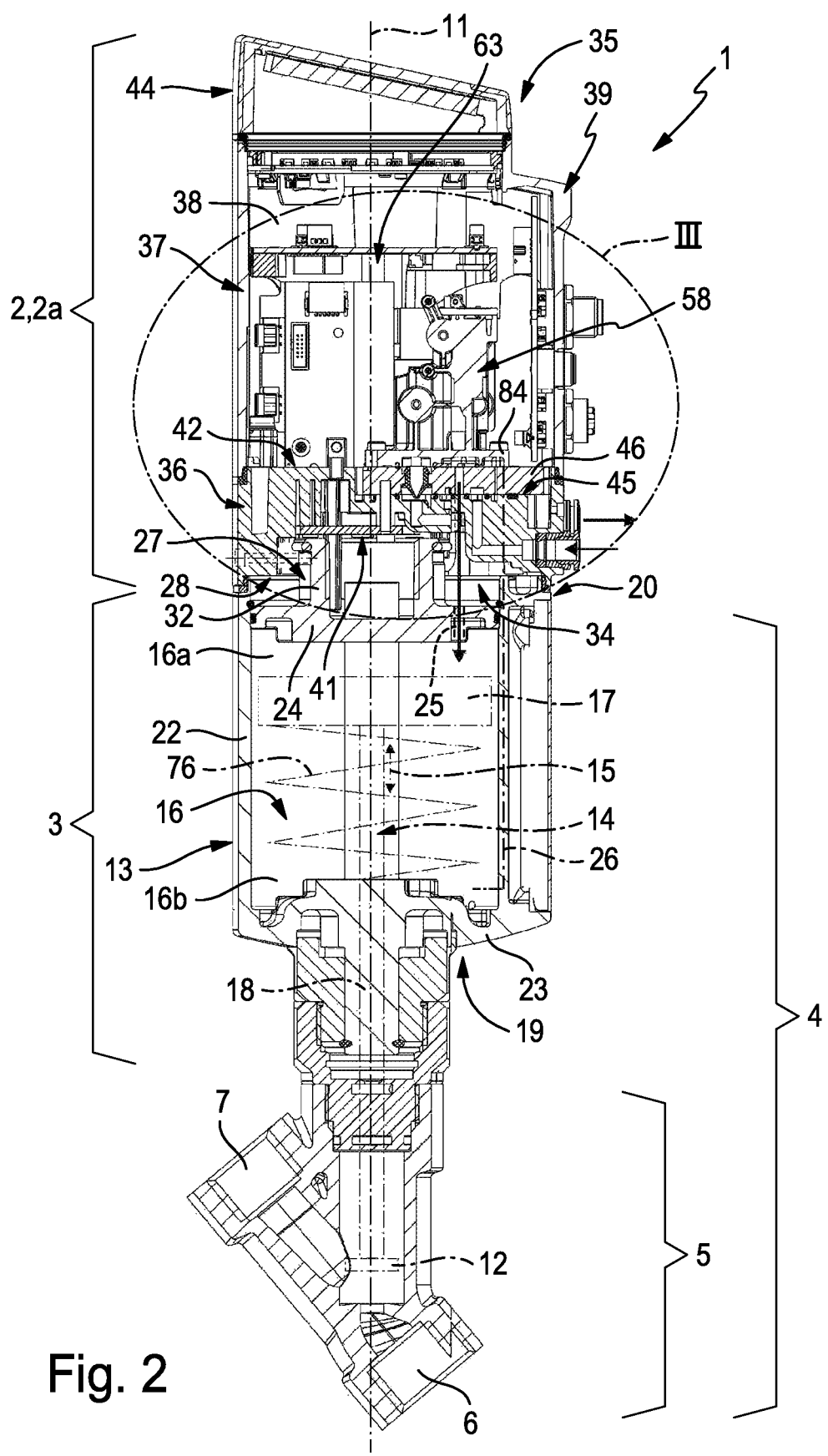
FIG. 2 is an eccentric longitudinal section of the process control device from FIG. 1, wherein a drive unit of the actuating drive is indicated only with dot-dash lines.
Figure 3:
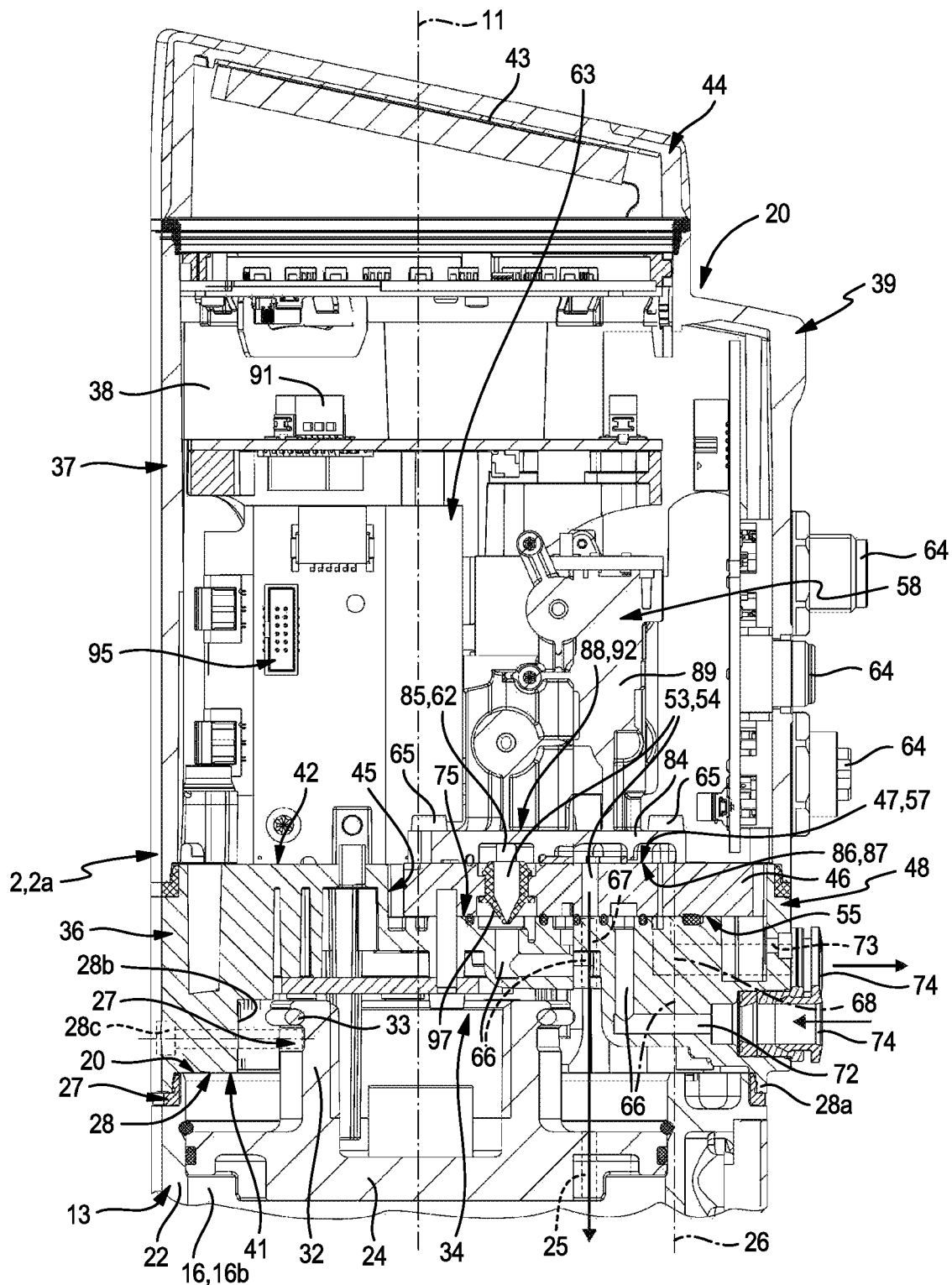
FIG. 3 is an enlarged illustration of the cut-out III bordered in FIG. 2 with dot-dash lines.

In the embodiment illustrated with reference to FIGS. 1 to 3, the pneumatic actuating drive 3 is configured as a so-called single-action actuating drive. The movement and positioning of the drive unit 14 results in this instance exclusively from a controlled application of fluid to the first operating chamber 16a, whilst a counter-force is applied by a restoring spring 76 which is indicated with dot-dash lines and which rests in the second operating chamber 16b. In this instance, the second drive housing channel 26 which communicates with the second operating chamber 16b is as non-functional as the drive channel 68 of the fastening module 36 which communicates with it. This arrangement can also be transposed.

A mask-like sealing element 77 which is interposed between the lower side 55 of the interface plate 46 and the assembly face 75 of the fastening module 36 and which is preferably constructed as a moulded seal and which in particular comprises a resilient material, surrounds the mutually opposing channel openings and ensures a connection which is fluid-tight with respect to the environment between the interface plate fluid channel system 54 and the fastening module fluid channel system 66.

Another sealing element 78 which is preferably also constructed in a mask-like manner is interposed between the assembly interface 57 of the interface plate 46 and the control valve device 58 in order to seal the fluid connection between the interface plate fluid channel system 54 and the control valve fluid channel system 62 with respect to the environment.

The interface plate 46 is advantageously screwed from the lower side 34 of the fastening module 36 to the fastening module 36 and thereby pressed on the assembly face 75. The interface plate 46 has for this purpose a plurality of fastening holes 81 which open in the direction towards the lower side 55 thereof and which are preferably constructed in a blind-hole-like manner and in which there is screwed one of a plurality of fastening screws 82, which is inserted from the lower side 41 through a through-hole 83 of the fastening module 36. Each of these fastening screws 82, of which only one is illustrated in FIG. 5, is supported with the screw head thereof on the lower side 41 of the fastening module 36.

The control valve device 58 is advantageously constructed as a structural unit which can be handled in a uniform manner for assembly on the interface plate 46 so that it is possible to refer to a control valve unit. In this instance, it is advantageous for the control valve device 58 according to the illustrated embodiments to have a rigid support plate 84 and to be placed exclusively via this support plate 84 on the interface plate 46 and secured to the interface plate 46.

A support plate fluid channel system 85 extends through the support plate 84 and is a part-system of the control valve fluid channel system 62 and communicates with valve channels which are formed directly in the at least one control valve 61.

The support plate 84 has at the lower side 86 thereof facing the interface plate 46 a mechanical-pneumatic attachment interface 87 which when the control valve device 58 is mounted on the interface plate 46 is coupled to the assembly interface 57 of the interface plate 46. The fluid channels of the control valve fluid channel system 62 or the support plate fluid channel system 85 open at the fitting interface 87 in such a manner that they communicate with opposing channel openings of the interface plate fluid channel system 54.

In order to fasten the support plate 84 and consequently the entire control valve device 58 to the interface plate 46, there is located on the assembly interface 57 a plurality of fastening holes 69 which are each provided with an inner thread. The support plate 84 has in the vertical direction thereof continuous through-holes in which the fastening screws 65 which have already been mentioned above are introduced from above so that they are supported with the screw head thereof on the upper side 88 of the support plate 84. With the thread shaft which protrudes at the bottom out of the support plate 84, the fastening screws 65 are screwed in each case into one of the fastening holes 69 of the interface plate 57, whereby the support plate 84 and consequently the entire control valve device 58 is tensioned in the axial direction of the main axis 11 with the interface plate 46.

The control valve devices 58 of the different control valve device types may differ from each other in terms of the number and distribution of the through-holes thereof which are provided for receiving fastening screws 65. There are then different screw distribution patterns in the different control valve device types. In the embodiment of the interface plate 46, in this context there is advantageously provision for in some cases the same and in some cases different fastening holes 69 to be used for coupling to the fastening screws 65. However, it is also possible for assembly of different control valve device types to always use different fastening holes 69 of the fastening module 36.

According to the control valve devices 58 of the control valve device types illustrated in FIGS. 4(e) and 4(f), a plurality of control valves 68 may be individually mounted on the support plate 84. It is also possible using the control valve device types illustrated in FIGS. 4(c) and 4(d) to provide a plurality and in particular all control valves 61 of the control valve device 58 on a common base member 89 and using this common base member 89 to mount them together on the support plate 84.

The support plate 84 may be constructed separately from or integrally with the above-mentioned base member 89.

Preferably, the support plate 84 has at the upper side 88 thereof an equipment face 92 on which the control valves 61 are secured individually or using a base member 89 which is associated together with a plurality of control valves 61. The securing is advantageously carried out using a screw connection.

According to the embodiments shown in FIGS. 4(e) and 4(f), the support plate 84 may be constructed in a modular manner in the vertical direction thereof and be composed of a plurality of plate-like support plate modules 93 which are stacked one on the other in the vertical direction thereof and which are also constructed in a plate-like manner in each case. According to the other illustrated embodiments, however, the support plate 84 may also be constructed as an integral component.

The control valve device 58 of the control valve device types illustrated in FIGS. 4(c) and 4(d) have a 3/2-way valve functionality and are suitable for controlling a single-action pneumatic actuating drive 3. The control valve devices 58 illustrated in FIGS. 4(d) and 4(f) are each of a control valve device type having a 5/3-way valve functionality so that they are particularly suitable for controlling a dual-action pneumatic actuating drive 3.

In the production of the control unit 2, the fastening module 36 according to arrow 94 may selectively alternatively be provided with a control valve device 58 of each of the control valve device types illustrated in FIGS. 4(c), 4(d), 4(e) and 4(f).

At least one fluid channel 53 of the interface plate fluid channel system 54 may be provided with a non-return valve 97. The non-return valve 97 is preferably constructed as a structural unit and inserted in the manner of a cartridge into the relevant fluid channel 53. Preferably, the non-return valve 97 is a resilient component which is fixed in the associated fluid channel 53 by means of snap-fitting. By way of example, the interface plate fluid channel system 54 is provided with a total of three non-return valves 97.

Preferably, a non-return valve 97 is located in a fluid channel 53 which communicates with the supply channel 72, wherein the passage direction faces away from the associated connection opening 74. Another non-return valve 97 is advantageously arranged in a fluid channel 53 which communicates with a ventilation channel 73, wherein the passage direction of this non-return valve 97 faces towards the associated connection opening 74. Preferably, a fluid channel 53 of the interface plate fluid channel system 54 serves to ventilate the housing inner space 38 of the control unit housing 37, which communicates with a ventilation channel 73 of the fastening module fluid channel system 66 and in the path of which there is connected a non-return valve 97 which blocks in the direction towards the housing inner space 38 and allows passage in the opposite direction.

The control unit 2 advantageously has a closed-loop control functionality which is the case in the embodiment. A controlled and in particular positionally regulated operation of the actuating drive 3 is thereby possible. The control unit 2 also represents in this instance a position control unit 2a which can also be referred to as a positioner.

The control electronics 63 has a desired value input 91 to which, via the electromechanical interface means 64, it is possible to supply from the outer side desired value signals which correspond to the sought desired position of the drive unit 14. The desired value signals are provided by an external electronic control device.

The knowledge of the actual position of the drive unit 14 required for position control is provided for the control electronics 63 by means of feedback means 95 which cooperate with the drive unit 14 and which are connected to a feedback signal input 96 of the control electronics 63. The feedback means 95 are capable of providing continuous position information relating to the drive unit 14 as electrical signals to the control electronics 63. The feedback means 63 are, for example, formed by a path measurement device.

Depending on the comparison result between the desired values and actual values supplied to the control electronics 63, the control valve device 58 is electrically controlled by the control electronics 63 in order to correspondingly actuate the pneumatic actuating drive 3.

In a simpler embodiment, the control electronics 63 has no closed-loop control functionality so that it can carry out only an unregulated control of the actuating drive 3, wherein in particular singular sensor signals are processed as feedback signals.

The invention claimed is:

1. A process control device comprising an electropneumatic control unit which is designed to control a pneumatic actuating drive and which comprises a fastening module which has at a lower side a fastening interface which is designed for fastening to a drive housing of the actuating drive and which has an electrically actuatable control valve device which is fixed to the fastening module and which contains at least one control valve and which communicates with at least one drive channel extending through the fastening module for fluid connection to the actuating drive, wherein the control unit has an interface plate which is separate from the fastening module and which is mounted on the fastening module at the upper side thereof facing away from the fastening interface and through which an interface plate fluid channel system extends which communicates with the at least one drive channel of the fastening module, wherein the interface plate at the upper side thereof facing away from the fastening module has a mechanical-pneumatic assembly interface on which the control valve device is mounted with simultaneous communication with the interface plate fluid channel system, wherein the fastening module has at the upper side thereof facing away from the fastening interface a receiving recess, in which the interface plate is inserted, wherein the interface plate is completely received in the receiving recess in such a manner that the upper side thereof extends in a flush manner with the surface portions of the upper side of the fastening module which surround the receiving recess.

2. The process control device according to claim 1, wherein the control valve device is constructed as a structural unit and has a support plate which carries each control valve of the control valve device and through which there extends a support plate fluid channel system which communicates with the at least one control valve, wherein the control valve device is mounted by means of the support plate on the assembly interface of the interface plate in such a manner that the support plate fluid channel system is in fluid connection with the interface plate fluid channel system.

3. The process control device according to claim 2, wherein the support plate at the lower side thereof facing the interface plate has a mechanical-pneumatic attachment interface which is coupled with the assembly interface of the interface plate and at the upper side facing away therefrom carries the at least one control valve, wherein it has at this upper side an equipment face which is equipped with the at least one control valve.

4. The process control device according to claim 2, wherein the support plate is constructed in one piece or is constructed in a modular manner being composed of a plurality of plate-like support plate modules which are stacked one on the other in the vertical direction thereof.

5. The process control device according to claim 1, wherein the control valve device has a plurality of control valves.

6. The process control device according to claim 5, wherein the control valve device is constructed as a structural unit and has a support plate which carries each control valve of the control valve device and through which there extends a support plate fluid channel system which communicates with the at least one control valve, wherein the control valve device is mounted by means of the support plate on the assembly interface of the interface plate in such a manner that the support plate fluid channel system is in fluid connection with the interface plate fluid channel system, and wherein the plurality of control valves are fastened individually to the support plate or are together fastened to the support plate via a common base member.

7. The process control device according to claim 1, wherein all the fluid channels of the interface fluid channel system extend through the interface plate in a linear manner in the vertical direction thereof from the lower side to the upper side, wherein the opening pattern of the fluid channels of the interface fluid channel system at the lower side and at the upper side of the interface plate is identical.

8. The process control device according to claim 1, wherein the interface plate is fixed to the fastening module by means of fastening screws which extend through the fastening module from below.

9. The process control device according to claim 1, wherein it has a plurality of control valve devices of different types which differ from each other at least in terms of one or both of their functionality and structure, wherein the assembly interface of the interface plate is constructed for the alternative mounting thereon of a control valve device of each present type of control valve device.

10. The process control device according to claim 9, wherein the control valve device of a first control valve device type contains at least one piezo-valve as a control valve and wherein the control valve device of a second control valve device type contains at least one solenoid valve as a control valve.

11. The process control device according to claim 9, wherein the control valve device of a first control valve device type has a 3/3 valve functionality and wherein the control valve device of a second control valve device type has a 5/3 valve functionality.

12. The process control device according to claim 9, wherein the assembly interface of the interface plate for fastening each control valve device has a plurality of fastening holes which are provided with inner threads, wherein the fastening holes are used to fix fastening screws which are supported on the control valve device.

13. The process control device according to claim 9, wherein a mask-like sealing element is arranged between the fastening module and the interface plate by which a fluid-tight connection towards the environment is produced between the interface plate fluid channel system and a fastening module fluid channel system which comprises the at least one drive channel.

14. The process control device according to claim 1, wherein the fastening module is designed in a plate-like manner.

15. The process control device according to claim 1, wherein the pneumatic actuating drive has a drive housing, in which a drive unit extends which can be moved by means of controlled application of compressed air and which protrudes at a front side of the drive housing, wherein the control unit is fitted at the rear side of the drive housing by means of the fastening interface.

16. The process control device according to claim 1, wherein the pneumatic actuating drive is a component of a process valve of the process control device and is designed to actuate a valve fitting of the process valve.

17. The process control device according to claim 1, wherein the electropneumatic control unit contains a control electronics which for electrical control is connected to the control valve device.

18. The process control device according to claim 17, wherein the electropneumatic control unit is designed as a position control unit, the control electronics of which has a position regulation functionality.

19. The process control device according to claim 17, wherein the control electronics has at least one feedback signal input which is suitable for receiving feedback signals of the actuating drive, wherein the control unit is provided with feedback means which are used to generate feedback signals of the actuating drive and which are connected to the feedback signal input in terms of signal transmission.

* * * * *